United States Patent [19]
Meyer et al.

[11] 3,710,857
[45] Jan. 16, 1973

[54] PRESSURE-RETENTIVE VESSEL, E.G. FOR PRESSURIZED-FLUID NUCLEAR REACTORS

[75] Inventors: Joachim Meyer; Josef Pfeffer, both of Essen, Germany

[73] Assignee: Fried. Krupp GmbH, Essen, Germany

[22] Filed: May 4, 1970

[21] Appl. No.: 34,081

[52] U.S. Cl. ................................................ 165/169
[51] Int. Cl. ................................................. F28f 3/12
[58] Field of Search ..................... 165/47, 136, 169

[56] References Cited

UNITED STATES PATENTS

| 3,454,080 | 7/1969 | Kunzli | 165/136 X |
| 3,424,239 | 1/1969 | Coudray | 165/169 X |

Primary Examiner—John J. Camby
Attorney—Karl F. Ross

[57] ABSTRACT

A pressure-retentive thermally insulated vessel, e.g., for pressurized-fluid nuclear reactors, and a method of making same in which a thin-wall inner shell of corrosion-resistant metal (e.g. stainless steel) is welded from cylinder segments into a hermetically closed container. The outer shell of the double-wall lining, whose interwall space is filled with a force-transmitting thermally insulating material (e.g. a low heat-conductivity concrete), is welded together of cylinder segments of heavy-gauge steel. To support the inner wall, a plurality of radial angularly and axially spaced tie rods are welded to the outer surface of the thin inner vessel, passed through openings in the outer wall, and engage in the surrounding body of concrete serving as the outer support and radiation-shielding mass. The openings are sealed by welding and the rods are rigidly fixed to the outer wall, e.g. via bridge plates overlying the openings.

6 Claims, 5 Drawing Figures

Inventors:
JOACHIM MEYER
JOSEF PFEFFER

Karl J. Ross
ATTORNEY

PRESSURE-RETENTIVE VESSEL, E.G. FOR PRESSURIZED-FLUID NUCLEAR REACTORS

FIELD OF THE INVENTION

Our present invention relates to pressure-retentive and thermally insulating vessels, to a method of erecting such vessels, to improved lining structures for these vessels and, more particularly, to a pressurized-fluid nuclear-reactor chamber defined by an improved pressure-retentive, thermally insulating and radiation-shielding vessel, especially for housing nuclear-reactor cores.

BACKGROUND OF THE INVENTION

It has been proposed in reactor technology to provide massive reactor structures of concrete or the like which are cast about a vessel or lining so as to constitute a structural support for the metallic lining to the extent necessary to retain any critical or leakage event while, at the same time, serving as a radiation shield, adapted to restrict radiation flux from the interior of the reactor to populated environments therearound.

The "vessel" heretofore used for this purpose, comprised a massive prestressed concrete outer body which also provided a metallic lining adapted to contain the radiation materials, i.e., leaked radioactive fuels, fission products, irradiated materials, etc.

Such prestressed-concrete containment vessels for nuclear reactors have numerous advantages. Firstly, this mode of construction offers considerable freedom of choice in the size, shape and pressure-retentive or loading capacity of the structure. Secondly, concrete inherently is an excellent shielding material with a low failure rate and relatively high shielding capacity per unit thickness of any shielding wall constructed therefrom. Thirdly, any danger of diffusion or leadage of radioactive materials through the concrete, which occasionally with time may become more or less permeable, is precluded by the inner lining structure.

One of the primary disadvantages of conventional metal-lined, reinforced and/or prestressed concrete vessels is that, while the reinforced concrete mass surrounding the metal lining is an effective insulation, the concrete cannot withstand temperatures in or above the 70° to 80° C range to which the concrete is subjected at the interface in nuclear-reactor structures using concrete and metal lining arrangements.

Furthermore, the metal linings themselves are more prone to corrosion at high temperatures, e.g. 300° C and above, as may arise in nuclear-reactor applications. It is not a solution, from a point of view of the economics of the nuclear-reactor art, to employ massive metal linings of corrosion-resistant materials such as stainless steel and, indeed such steels, when provided in the massive thicknesses required for pressure retention, are increasingly likely to be subject to stress crack, corrosion and the like at the elevated temperatures at which the reactor operates.

OBJECT OF THE INVENTION

It is, therefore, the principal object of the present invention to provide an improved wall structure for pressure vessels in which the aforementioned disadvantages can be avoided.

Another object of this invention is the provision of a pressure-retentive, thermally insulating vessel of relatively low cost and yet excellent resistance to corrosion at the enclosed chamber, resistance to stress as may be result from pressure within, and of thermal transmissibility.

Another object of our invention is to provide a metal liner system for prestressed-concrete pressure vessels enabling them to be used effectively with corrosive high temperature fluids, e.g., in fluid-cooled nuclear reactors, in an economical and practical manner.

Still further, it is an object of this invention to provide an enclosure for a gas-pressure, pressurized-water or other nuclear reactor operating under elevated fluid pressure.

It is also our object to provide an improved method of making a structure of the general character described which is capable of retaining elevated pressures, manifests a high degree of thermally insulating capability, is hermetically sealed to preclude escape of radioactive or other materials, is substantially noncorrodible and is economical to construct.

SUMMARY OF THE INVENTION

These objects and others, which will become apparent hereinafter, are attained, in accordance with the present invention, through the provision of a pressure-retentive vessel which includes a massive body of concrete surrounding the enclosed chamber, and a lining structure interposed between this body and and the chamber, the lining being of the double-wall type and comprising an inner, relatively thin sheet-metal shell of a metal of low corrodibility, welded from cylindrical segments into an inner vessel preventing escape of active materials from the compartment enclosed thereby. This thin-walled vessel constitutes a membrane which can be flexed by pressure within the vessel and we provide therefore, as a low-thermal-conductivity means for transmitting the forces from the inner vessel to the outer vessel, a multiplicity of angularly equispaced rods which may be axially distributed as well, and preferably have a thickness (diameter) equal to or approximating the wall thickness of the inner vessel, the rods being substantially rigidly affixed to the outer, relatively thick metal shell, likewise welded together from cylinder segments and composed of a structural metal which need not be as expensive as the noncorroding metal of the inner shell.

The present invention thus provides a pressure-vessel liner which can be exposed to a fluid medium at high temperature and of a corrosive nature, may be subjected to high internal temperatures without increasing the danger of failure of the noncorroding inner liner, and may be used without the danger that the temperature along the outer wall of the double-wall liner will reach 70° to 80°C and becomes detrimental to the surrounding concrete body, while enabling the entire assembly to be erected at the construction site in whole or in part prior to casting of the prestressed concrete outer mass.

The invention may thus include a concentric (coaxial) liner arrangement, the inner wall of which is composed of corrosion-resistant material, e.g., stainless steel, monel, while the outer wall is composed of structural steel, the inner and outer walls being spaced radial by a multiplicity of small cross-section members defining a substantially rigid structure. The supporting members serve to limit the span of the inner wall which is subject to outward buckling pressure from the enclosed fluid. When the distance (angular or axial) between these generally radial members is sufficiently small, the thickness of the inner wall can be reduced to a very samll fraction of that of the outer wall. Preferably, the inner liner has a thickness which is less than half that of the outer liner.

The several components of the double-wall structure may be fabricated and partially assembled in a steel-fabrication plant and moved to the construction site in easily transported subassemblies. At the construction site, the segments are joined by deposit-weld seams to form the complete liner structure, whereupon concrete is cast around the liner and stressed in the conventional manner.

According to a more specific feature of this invention, the outer shell is formed with openings through which the connecting members extend, the clearance between the members and the walls of the openings being blocked by bridge pieces welded along the outer surface of the shell. The connecting rods themselves are preferably welded to the outer surface of the inner vessel. Advantageously, projecting portions of the members extend beyond the outer wall of the outer shell and into the surrounding concrete body where they are anchored in the matrix of the concrete vessel and serve to transmit the internal-pressure load to the shell.

Still another feature of this invention resides in the filling of the interwall space with a rigid insulating material, e.g., so-called insulating concrete, serving to reduce transmission of heat to the outer vessel and, therefore, the concrete body therebeyond. This rigid insulation layer, although serving as an additional force-transmitting medium between inner and outer shells, can be subject to deterioration at elevated temperatures since the radial members or spokes are dimensioned to take up the full operational load plus an additional safety factor as if the insulating layer had no force-transmitting capability.

Still another feature of the invention resides in the provision at the outer vessel or wall of coolant channels designed to maintain the interface between the surrounding concrete body and the outer metal shell at a temperature below 70° to 80° C, when the insulating qualities of the double-wall structure do not suffice.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
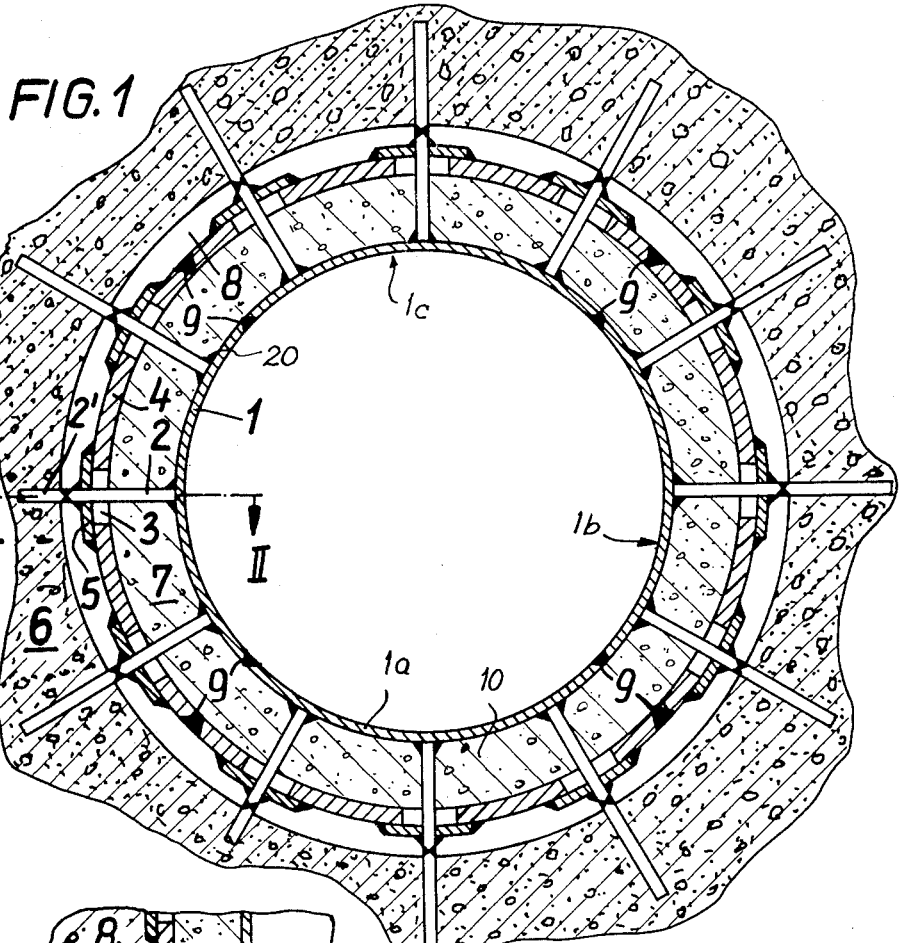
FIG. 1 is a horizontal cross-sectional view through a pressure-retaining vessel according to this invention.
Figure 2:
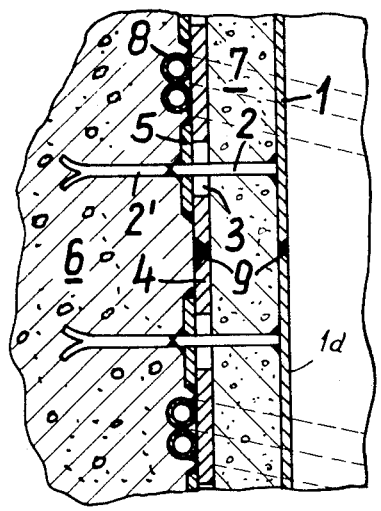
FIG. 2 is a vertical section along this line II — II of FIG. 1.

As will be apparent from FIGS. 1 and 2, the basic vessel structure comprises a concrete body 6 of the prestressed and reinforced type commonly used to surround nuclear reactors of the gas-pressure or pressurized-water type and formed with a metal shell. The conventional shell is, in accordance with the present invention, replaced by a double-wall shell whose interwall space 7 can be filled with expanded concrete, lightweight or cellular concrete, concrete made with expanded perlite aggregates and like insulating concretes.

The basic lining structure comprises a hermetically sealed thin stainless-steel inner liner 2, formed from a plurality of cylinder segments 1a, 1b, 1c and joined by welds 9, here shown to be formed from the inside during assembly of the inner liner at a steel-fabrication plant or, from preassembled parts, at the construction site.

Along the exterior surface of the shell 1, we provide closely spaced radial spokes 2 which are welded at 20 to the inner vessel and protrude through corresponding holes 3 in the relatively thick structural-steel outer liner 4. The latter is welded from the exterior into a sealed structure along weld seams of conventional type from a plurality of cylindrical segments. The supporting members 2 are rigidly connected to the outer liner 4 by being welded to bridge pieces 5 which, in turn, are welded to the outer liner to completely seal the openings 3. Beyond the bridge pieces 5, the spokes 2 are extended by anchors 2' welded or otherwise connected to the spokes 2 and having outwardly flared bifurcated ends embedded in the concrete matrix 6. During the slight expansion and contraction of the inner vessel, the rods may manifest a slight twist or lateral movement with the flexural limits of rod and bridge piece and centered a substantially at the intersection of the two, each bridge piece functions to this extent at least, as a membrane elastically permitting such movement while each rod forms a leaf spring. The lateral deflectibility of the rods within the elastic limit is greater with bridge plates secured to the outer periphery of the outer shell than when the rods are secured directly to the outer shell or to a bridge piece disposed along the inner surface.

The space 7 between the inner wall 1 and the outer wall 4 is filled with the expanded concrete 10 serving both as insulating and as a transmission means for the loads produced by the internal pressure acting on the inner liner and any compensatory no-load prestress applied by the outer concrete matrix. Coolant channels 8, in the form of helical tubes coiled around the outer wall between the spokes 2 and welded to this wall for maximum heat transfer, are provided to remove any heat conducted through the insulating material 10 and the spokes 2, as may be required to reduce the temperature along the interface with the concrete body 6 below the level of 70° to 80° C.

The liner assembly as described is constructed in a number of segments, each preferably covering one quarter ( a quadrant) of the circumference of the cylindrical shell. Four of these subassemblies are connected by means of welds 9a, 9b, 9c and 9d to form a ring and several such rings are joined by horizontal welds, such as 9e in FIG. 2, to form the complete vessel.

The subdivision into four arcuate segments is arbitrary, but at least one of the inner or outer liners must be segmented to permit all assembly welds to be completed from the inside of the inner wall or the outside of the outer wall.

Figure 3:
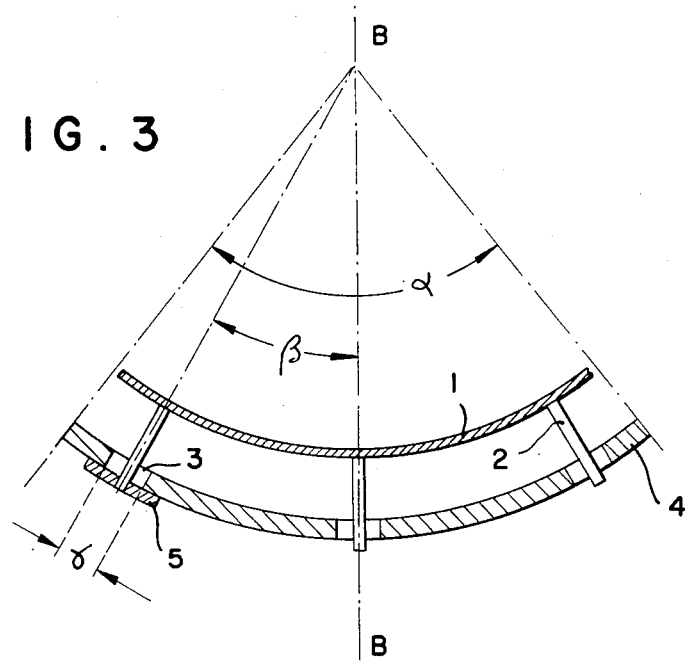
FIG. 3 is a diagram illustrating the manner in which the various components are assembled to form the liner.

FIG. 3 indicates the method of manufacturing a single subassembly. Supporting members 2 are first welded radially to inner wall 1 which encompasses an arc of magnitude $\alpha$. A corresponding section of the outer wall 4 is then brought near the segment of the inner wall 1 and the two moved together along the bisecting radius B — B, in such a manner that the radiating supporting members 2 move through holes 3 in the outer wall 4. Because of the angle $\beta$ included between the line of movement and the outermost supporting member the holes 3 must be larger (angular extent $\gamma$) than the corresponding cross-sections of the supporting members 2, the rigidity of the assembly being insured by the bridge pieces 5. The arc $\alpha$ should not substantially exceed a right angle for easy assembly; if it is restricted to angles much smaller than this, the clearance between supporting members 2 and holes 3 may be made small enough to permit bridging by means of the weld bead and the elimination of bridge pieces 5 from the assembly.

Figure 4:
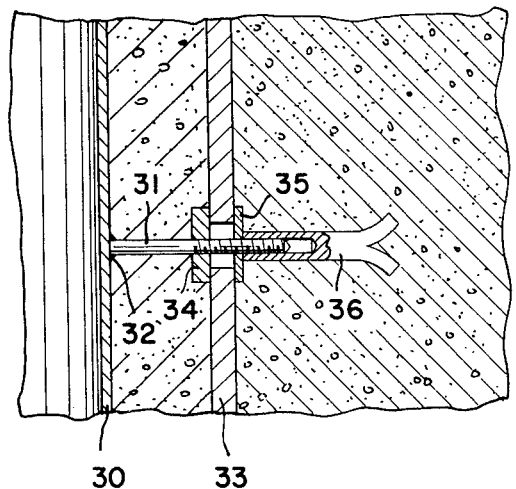
FIG. 4 is a detail view illustrating a modified construction of the support arrangement.

As will be apparent from FIG. 4, the sheet-metal inner wall 30 may be welded to spokes 31 at seams 32, but the connection of these spokes to the outer wall 33 may be accomplished without bridge plates. In this connection arrangement, the outer wall 33 is clamped between a nut 34 along the inner surface, threaded onto the spoke 31 and a washer 35 held by a rod 36 threaded onto the spoke 31 from the exterior. The rod 36 has a bifurcated end to form the extension of the spoke which is anchored in the concrete.

Figure 5:
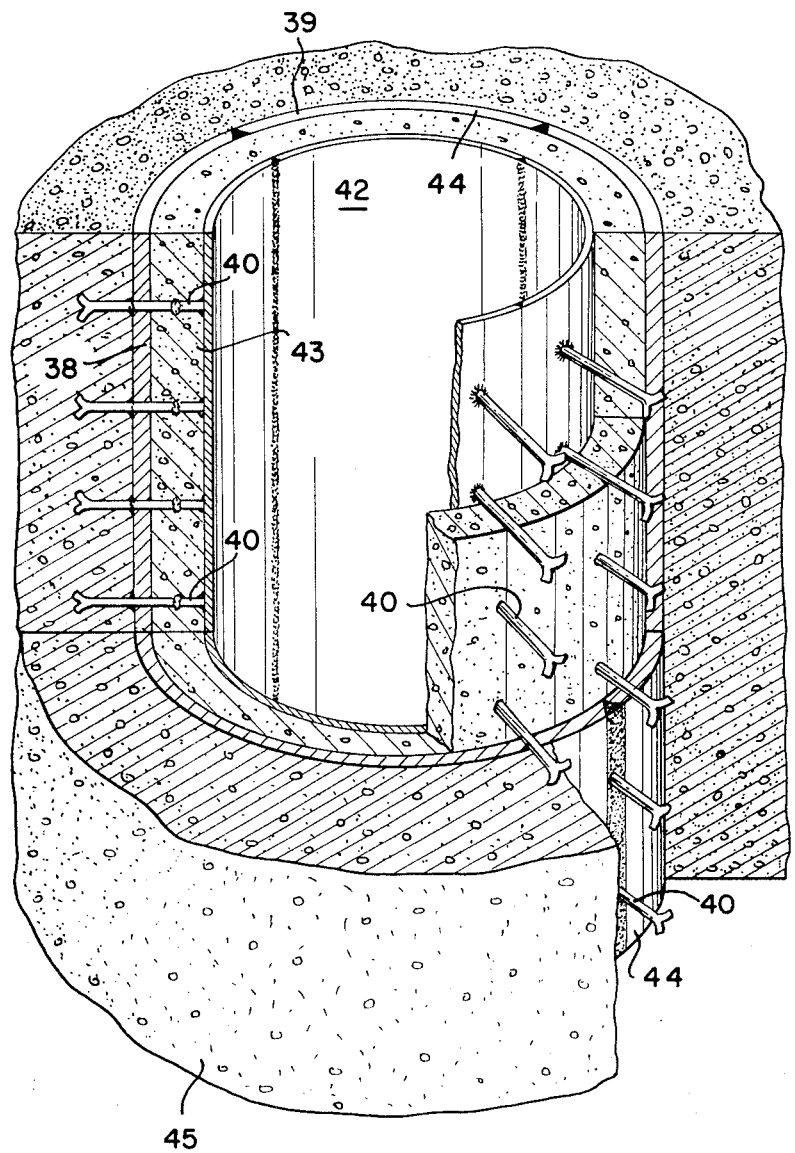
FIG. 5 is a vertical elevational view, partly broken away, of a pressure-retentive vessel in accordance with the present invention.

In FIG. 5, there is shown a structure in which the cylindrical segments 38 and 39 are so closely spaced or so numerous that the spokes 40 pass through the gaps between them, the gaps being welded closed as represented at 41. In this embodiment, the inner vessel 42, the intervening layer of insulating concrete 43, the outer vessel 44 and the outer concrete layer 45 are all illustrated and constituted as previously described.

It has been found that, for power reactors operating at 500 to 1000 MW, it is desirable to use pressure vessels with an internal diameter of 15 m or more. The inner liner is here made in cylinder segments of a maximum of 90° of arc while the radial spokes are distributed around the circumference in 150 to 200 in number and at the corners of squares 0.3 m on a side.

An important advantage of the present invention resides in the fact that cylindrical segments of the inner wall and corresponding segments of the outer shell may be united, with the respective spokes therebetween serving as connecting means. The resulting structure, for example as illustrated in FIG. 3, is a hollow-wall vessel segment which may be transported to the construction site and erected there, together with similar hollow-wall vessel segments, into a complete tank, the inner-shell members of the hollow-wall vessel segments being joined by internal welds and the outer-shell members being joined by external welds. The space between the now-completed inner and outer walls may then be filled with insulating concrete.

The improvement described and illustrated is believed to admit of many modifications within the ability of persons skilled in the art, all such modification being considered within the spirit and scope of the invention except as limited by the appended claims.

We claim:

1. A pressure-retentive vessel, comprising:
a liner enclosing a pressure compartment and including a pressure-retentive sealed, relatively thin inner wall of corrosion-resistant material directly enclosing said compartment, a relatively thick outer wall spacedly surrounding said inner wall and enclosing same, and a multiplicity of outwardly extending rod members welded to said inner wall perpendicular thereto and substantially rigidly fixed to said outer wall for force-transmission between said outer and inner walls;
a reinforced concrete body surrounding said liner, each of said walls being of substantially cylindrical configuration and being composed of a plurality of cylinder segments joined along respective weld seams, said rod members extending radially from the inner wall to the outer wall;
a plurality of generally outwardly extending anchors formed on said outer wall and embedded in said body, and each formed as an extension of one of said rod members, said rod members projecting through said outer wall, said lining being further formed with cooling channels for conduction of a cooling fluid therethrough, said outer wall being formed with respective openings of a cross-section in excess of the cross-section of the respective rod member and said rod members extending with clearance through said openings, said liner further comprising bridge pieces welded to said outer wall along the outer surface thereof and closing said clearances.

2. The vessel defined in claim 1 wherein said members pass through openings in and are each sealingly welded to said bridge pieces about the peripheries of said rod members.

3. The vessel defined in claim 2, further comprising a rigid insulating mass received in the space between said walls.

4. The vessel defined in claim 3 wherein said rod members are of circular cross-section.

5. The vessel defined in claim 4 wherein said vessel is a nuclear-reactor enclosure and said inner wall is composed of stainless steel and has a thickness less than half the thickness of said outer wall, said outer wall being composed of structural steel, said insulating means consisting of insulating concrete, said cooling channels including tube means coiled around said outer wall and in heat-conducting relation therewith.

6. A method of making the vessel defined in claim 5, comprising the steps of fabricating a plurality of cylindrical inner-wall segments from stainless steel, and a plurality of cylindrical outer wall segments from structural steel while forming a multiplicity of openings in said outer wall segments; at a location remote from the vessel site welding a plurality of generally radial metal spokes to the exterior of at least one inner-wall segment, fitting an outer-wall segment spacedly around the innergwall segment and welding said spokes thereto, thereby forming a hollow-wall vessel segment; assembling a plurality of such hollow-wall vessel segments into a final vessel configuration at the vessel site and internally welding the inner-wall segments of the hollow-wall vessel segments together and externally welding to the outer-wall segments of said hollow-wall vessel segments together; filling the space between the inner wall formed by said inner-wall segments and the outer wall formed by said outer-wall segments with a rigid thermal insulating material; and casting a concrete body around said outer wall.

* * * * *